(12) United States Patent
Chen et al.

(10) Patent No.: US 12,379,247 B2
(45) Date of Patent: Aug. 5, 2025

(54) BROAD-SPECTRUM IMAGING SPECTROMETER BASED ON TRANSMISSION AND REFLECTION INTEGRATED STRUCTURE

(71) Applicant: Jiangsu Dualix Spectral Imaging Technology Co., Ltd., Wuxi (CN)

(72) Inventors: Xinghai Chen, Wuxi (CN); Yelin Liu, Wuxi (CN); Yanqiu Zhou, Wuxi (CN); Fei Tong, Wuxi (CN)

(73) Assignee: Jiangsu Dualix Spectral Imaging Technology Co., Ltd., Wuxi (CN)

( * ) Notice: Subject to any disclaimer, the term of this patent is extended or adjusted under 35 U.S.C. 154(b) by 204 days.

(21) Appl. No.: 18/452,738

(22) Filed: Aug. 21, 2023

(65) Prior Publication Data
US 2024/0393176 A1    Nov. 28, 2024

(30) Foreign Application Priority Data
May 26, 2023 (CN) .......................... 202310609730.0

(51) Int. Cl.
*G01J 3/02* (2006.01)
*G01J 3/28* (2006.01)

(52) U.S. Cl.
CPC ............. *G01J 3/0208* (2013.01); *G01J 3/021* (2013.01); *G01J 3/0237* (2013.01); *G01J 3/0291* (2013.01); *G01J 3/2823* (2013.01)

(58) Field of Classification Search
CPC .. G01J 2003/1208; G01J 3/0208; G01J 3/021; G01J 3/0237; G01J 3/0256;
(Continued)

(56) References Cited

U.S. PATENT DOCUMENTS 10,444,073 B1    10/2019 Noguchi et al.
2012/0105845 A1    5/2012 Herrala
(Continued)

FOREIGN PATENT DOCUMENTS

| CN | 102762966 A | 10/2012 |
| CN | 103017902 A | 4/2013 |
| CN | 219830105 U | 10/2023 |

OTHER PUBLICATIONS

First Office Action issued in counterpart Chinese Patent Application No. 202310609730.0, dated May 24, 2025.

*Primary Examiner* — Hina F Ayub
(74) *Attorney, Agent, or Firm* — Westbridge IP LLC

(57) ABSTRACT

Disclosed is a broad-spectrum imaging spectrometer based on reflection and transmission integrated structure, including a coaxial reflection outer cylinder and a coaxial transmission outer cylinder. A slit component is provided at an incident end of the coaxial reflection outer cylinder; a spherical mirror and a plane mirror are provided above the slit component; incident light passes through the plane mirror, reflects off the spherical mirror, and is further reflected by the plane mirror into the coaxial transmission outer cylinder; a grating prism module and a focusing inner cylinder are provided within the coaxial transmission outer cylinder along a transmission direction, and a cemented lens module is provided in the focusing inner cylinder; the cemented lens module is fixedly provided inside the focusing inner cylinder, the focus inner cylinder is placed within an adjustment chamber of the coaxial transmission outer cylinder.

9 Claims, 9 Drawing Sheets

(58) Field of Classification Search
CPC .... G01J 3/0291; G01J 3/04; G01J 3/18; G01J 3/2823
See application file for complete search history.

(56) References Cited

U.S. PATENT DOCUMENTS

| | | | |
|---|---|---|---|
| 2013/0107270 A1* | 5/2013 | Stroganov | G01J 3/4532 356/451 |
| 2019/0094072 A1* | 3/2019 | Park | G01J 3/0208 |
| 2023/0116586 A1 | 4/2023 | Fujita et al. | |

* cited by examiner

BROAD-SPECTRUM IMAGING SPECTROMETER BASED ON TRANSMISSION AND REFLECTION INTEGRATED STRUCTURE

CROSS-REFERENCE TO RELATED APPLICATIONS

This application claims priority to Chinese Patent Application No. 202310609730.0, filed on May 26, 2023, the content of which is incorporated herein by reference in its entirety.

TECHNICAL FIELD

The embodiments of the present application relate to the technical field of spectrometers, and in particular to a broad-spectrum imaging spectrometer based on reflection and transmission integrated structure.

BACKGROUND

The hyperspectral imager, also known as a spectral camera, hyperspectral camera, or hyperspectral spectrometer, combines the imaging spectrometer with an area array detector. It is a non-destructive testing and analytical instrument capable of simultaneously and rapidly acquiring both spectral and image information. The main components of the hyperspectral imager include a collimating mirror, a spectrometer, a focusing lens, and an area array detector.

The imaging spectrometer captures one line of the target at a time and splits the light to disperse each spectral component onto one corresponding pixel on the linear array. As a result, each image structure from the spectral camera consists of a linear array of pixels in one spatial axis dimension and a spectral distribution in another spectral axis dimension.

In the related technology of Offner imaging, the optical configuration of the imaging spectrometer of Offner structure commonly adopts the Roland circle off-axis three-reflection structure, that is, comprising two concave spherical mirrors and one convex spherical grating. The convex spherical grating is located between the two concave spherical mirrors, with all reflecting spherical surfaces having their centers at the same point. The light emitted from the object plane is first reflected by the first concave spherical mirror and then diffracted into monochromatic light by the convex spherical grating. The diffracted monochromatic light is further reflected and focused onto the image plane by the second concave spherical mirror. Except for the rays emanating at different angles from the meridional plane that have the same optical path difference as the chief ray passing through the main axis, the optical path difference between the chief ray and rays incident at different angles from other planes varies. Therefore, the optical configuration with Roland circle off-axis three-reflection can only ensure that the rays emanating from the meridional plane have the same optical path difference as the chief ray passing through the main axis, eliminating only the meridian aberration while not simultaneously compensating for other aberrations. Additionally, the reflective grating, due to the requirement of metal-coated reflective film on its surface, unavoidably introduces different diffraction efficiencies for light with different degrees of polarization. This polarization effect can result in errors in calibrating the reflectance of the test target, indicating a need for improvement in imaging quality.

SUMMARY

The embodiments of the present application provide a broad-spectrum imaging spectrometer based on reflection and transmission integrated structure, addressing the issues of deviations and polarization effects in the off-axis components of the off-axis reflection imaging structures. The broad-spectrum imaging spectrometer based on reflection and transmission integrated structure comprises a coaxial reflection outer cylinder configured to reflect an optical path and a coaxial transmission outer cylinder configured to transmit an optical path, wherein a slit component is provided at an incident end of the coaxial reflection outer cylinder to collect incident light; a spherical mirror and a plane mirror are provided above the slit component; incident light passes through the plane mirror and undergoes a first reflection by the spherical mirror, and the plane mirror performs a second reflection of the light from the first reflection and directs the light into the coaxial transmission outer cylinder for transmission.

A grating prism module and a focusing inner cylinder are provided within the coaxial transmission outer cylinder along a transmission direction, a cemented lens module is provided in the focusing inner cylinder, and a terminal end of the outer cylinder connects to an imaging mechanism with an embedded detector chip and detector imaging surface; the cemented lens module is fixedly provided inside the focusing inner cylinder, the focusing inner cylinder is placed within an adjustment chamber of the coaxial transmission outer cylinder, and a width of the adjustment chamber is greater than a width of the focusing inner cylinder, facilitating changes in the distance between the cemented lens module and the grating prism module and the detector chip.

Optionally, the slit component comprises a slit seat and a front interface, and a conical channel and a rectangular channel are formed on the slit seat; a slit is formed at connection between the conical channel and the rectangular channel, and a slit glass is placed inside the rectangular channel; the plane mirror is embedded on the slit component with a mirror surface facing a transmission optical axis of the coaxial transmission outer cylinder; a mirror gap communicating with the rectangular channel is formed on the plane mirror, allowing external light to enter an inner cavity.

Optionally, the spherical mirror, the mirror gap, the conical channel, and the rectangular channel are located on a reflection optical axis of the coaxial reflection outer cylinder; incident light passes through the mirror gap on the plane mirror along the reflection optical axis and is reflected by the spherical mirror back to the plane mirror; the plane mirror directs the second reflected light along the transmission optical axis into the coaxial transmission outer cylinder.

Optionally, an annular groove is formed at an incident end of the coaxial transmission outer cylinder, and a removable annular connector is provided at a terminal end; the annular connector connects to the imaging mechanism.

The grating prism module is fixedly installed within the annular groove, and an inner diameter of the annular connector is smaller than an outer diameter of the focusing inner cylinder, forming the adjustment chamber between the annular groove and the annular connector.

Optionally, the grating prism module and the cemented lens module are perpendicular to the transmission optical axis of the coaxial transmission outer cylinder.

Optionally, the grating prism module comprises an annular lens holder, a grating, and a wedge prism; the grating and the wedge prism are fixed inside the lens holder according to a transmission direction.

Optionally, the cemented lens module comprises a first single lens, a first cemented lens group, a second cemented lens group, and a second single lens in sequence according to a transmission direction; the first single lens and the second single lens are single-sided convex lenses, each installed at two ends of the focusing inner cylinder through the fixed holder, with convex surfaces facing an incident end.

Optionally, the first cemented lens group comprises a first cemented convex lens, a first cemented concave lens, and a first cemented lens holder; the first cemented convex lens and the first cemented concave lens are fixedly installed on the focusing inner cylinder through the first cemented lens holder; the first cemented convex lens has a crescent-shaped cross-section with convex surface radii of 41.69 mm and 21.837 mm respectively on both sides, a wavelength range of 380 nm to 1000 nm, a center wavelength of 632.8 nm, and a center transmittance greater than 0.99; the first cemented concave lens is a double-sided concave lens with concave surface radii of 21.837 mm and 30.68 mm respectively on both sides, a wavelength range of 380 nm to 1000 nm, a center wavelength of 632.8 nm, and a center transmittance greater than 0.99.

Optionally, the second cemented lens group comprises a second cemented convex lens, a second cemented concave lens, and a second cemented lens holder; the second cemented convex lens and the second cemented concave lens are fixedly installed on the focusing inner cylinder through the second cemented lens holder; the second cemented convex lens is a double-sided convex lens with convex surface radii of 21.24 mm and 41.48 mm respectively on both sides, a wavelength range of 380 nm to 1000 nm, a center wavelength of 632.8 nm, and a center transmittance greater than 0.99; the second cemented concave lens has a crescent-shaped cross-section with concave surface radii of 21.24 mm and 37.4 mm respectively on both sides, a wavelength range of 380 nm to 1000 nm, a center wavelength of 632.8 nm, and a center transmittance greater than 0.99.

Optionally, a clamp is provided and an annular focusing slot is formed on an outer wall of the focusing inner cylinder, and adjustment holes corresponding to the clamp and the annular focusing slot are formed on the coaxial transmission outer cylinder; the clamp and the annular focusing slot are configured to adjust a fastening state and a focal length of the focusing inner cylinder, respectively.

The beneficial effects brought by the technical solutions provided in the present application include, but are not limited to: a reflection and transmission structure for an integrated imaging layout is adopted, which reduces three reflections to two reflections, achieving high light throughput while ensuring optimal imaging quality. The structure of the plane mirror with a slit on the mirror surface also ensures minimal light energy loss and has no impact on imaging quality. The spherical mirror confines imaging distance to a very small space, and the spatial arrangement between each lens establishes a scaled-down imaging relationship between the object-side image and the image-side image while enabling compact volume. Optimal efficiency and dispersion effects of the grating diffraction are ensured. The modular design of the transmissive lens group ensures flexible adjustments of the imaging relationships between the slit, the plane mirror group, the single lenses, the cemented lens group, and the detector, allowing for adjustable focal lengths. This enhances the versatility of the imaging spectrometer.

DETAILED DESCRIPTION OF THE EMBODIMENTS

To provide a clearer understanding of the objectives, technical solutions, and advantages of the present application, the present application will be further described in detail below with reference to the accompanying drawings.

The term "plurality" mentioned herein refers to two or more. The term "and/or" when describing the relationship between associated objects, indicates that there can be three possible relationships. For example, "A and/or B" may represent three scenarios: A exists independently, both A and B exist simultaneously, or B exists independently. The character "/" generally represents an "or" relationship between the associated objects before and after it.

Figure 1:
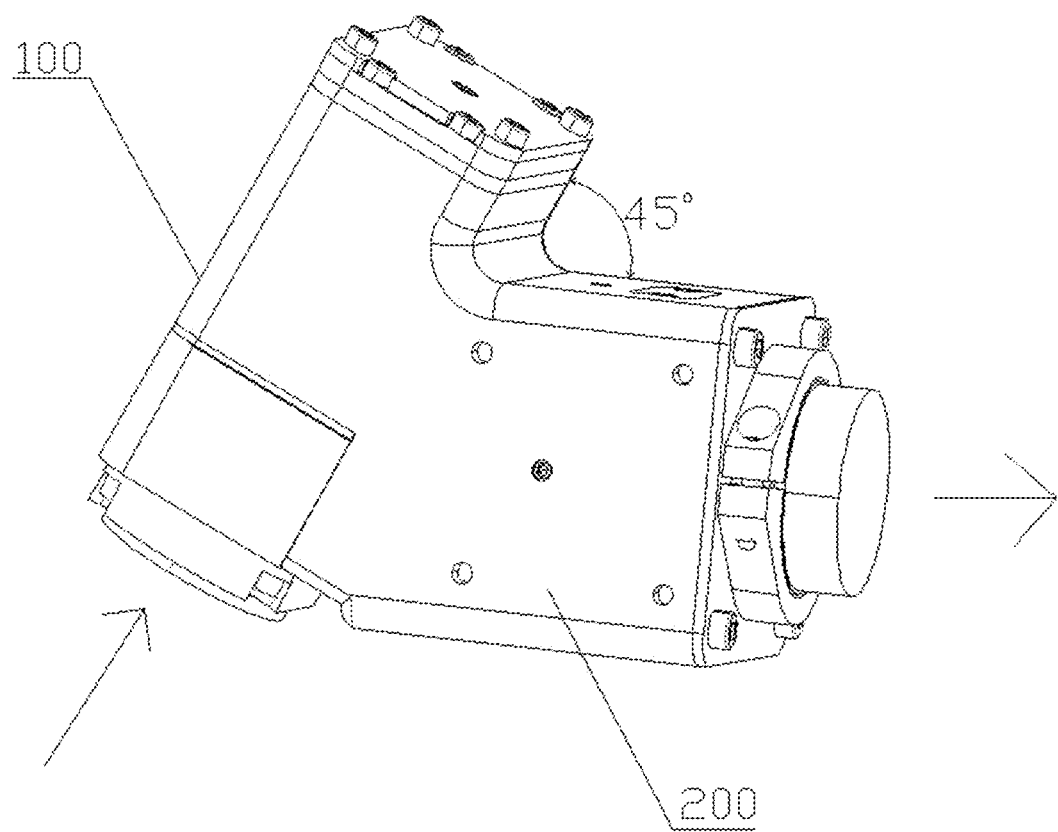
FIG. 1 is a structural diagram of the broad-spectrum imaging spectrometer based on reflection and transmission integrated structure.
Figure 2:
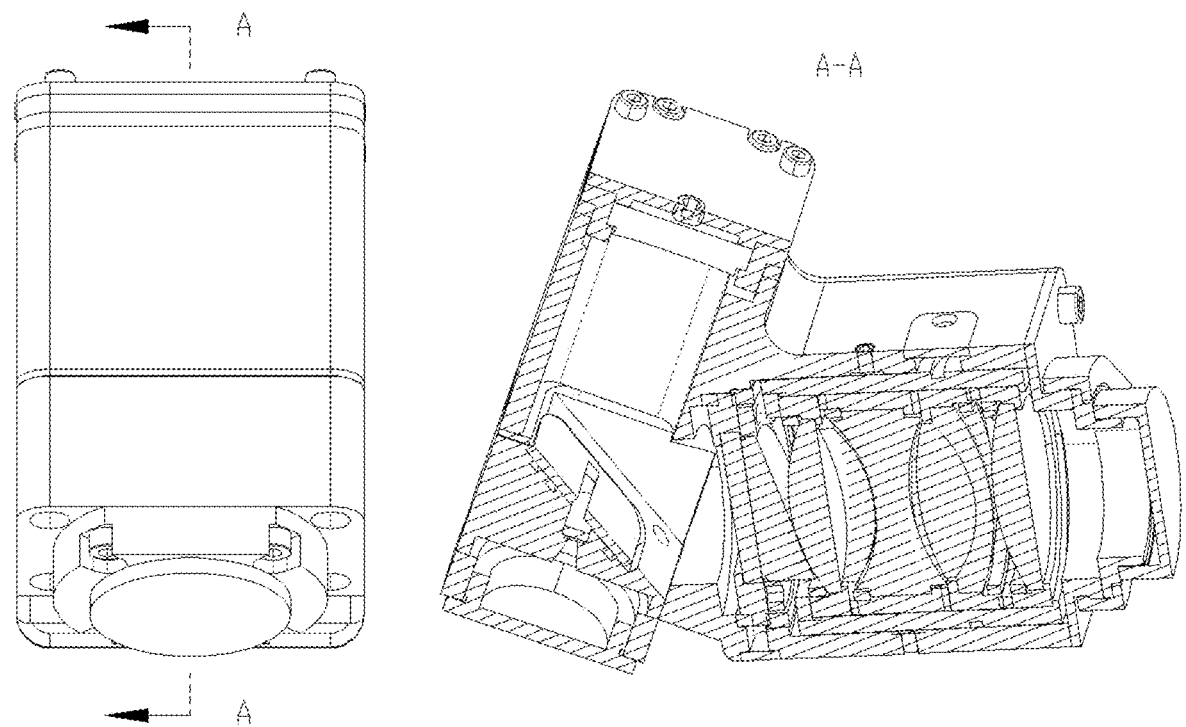
FIG. 2 is a side view and a cross-sectional view of the broad-spectrum imaging spectrometer based on reflection and transmission integrated structure.
Figure 3:
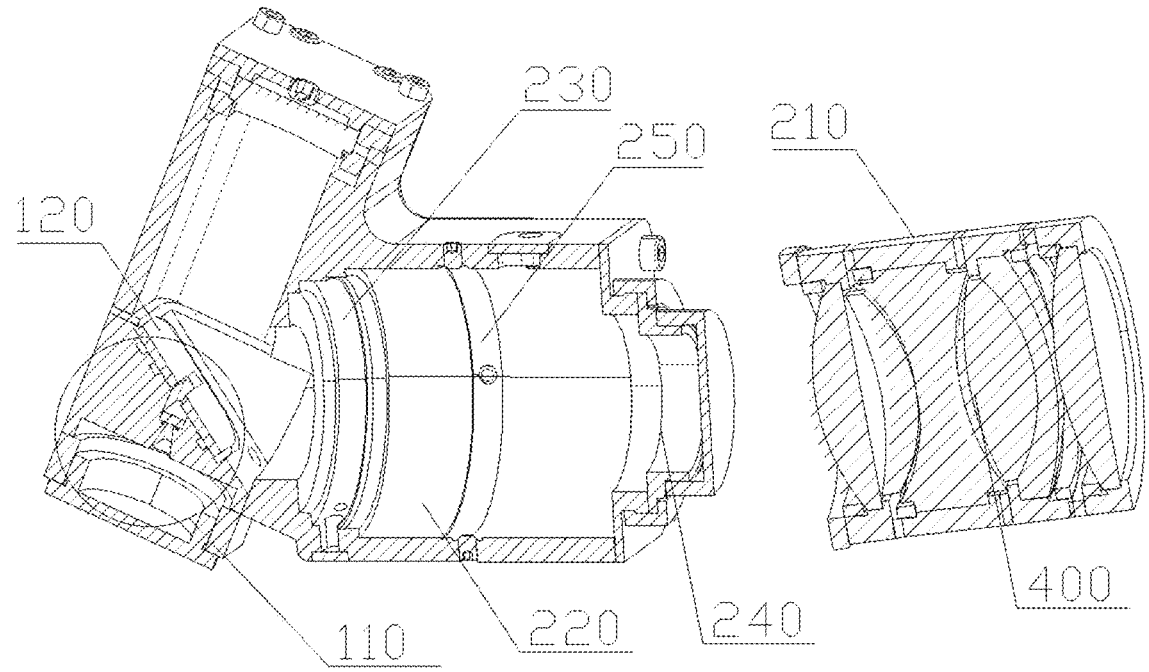
FIG. 3 is a structural diagram of the inner cavity of the focusing inner cylinder and the coaxial transmission outer cylinder.

FIG. 1 is a structural diagram of the broad-spectrum imaging spectrometer based on reflection and transmission integrated structure. The housing structure consists of a coaxial reflection outer cylinder 100 and a coaxial transmission outer cylinder 200. The coaxial transmission outer cylinder 200 is communicated with the coaxial reflection outer cylinder 100 to form an integrated inverted V-shaped structure with a V-angle of 45 degrees. The coaxial reflection outer cylinder 100 is configured to reflect the optical path and a slit component 110 is provided at the incident end thereof to collect incident light. As shown in FIGS. 2 and 3, the side wall of the slit component 110 is connected to the coaxial transmission outer cylinder 200, and a plane mirror 120 provided above the slit component 110 directs the light reflected by the reflection outer cylinder 100 into the coaxial transmission outer cylinder 200 through a connecting hole for transmission and then the subsequent generation of spectral images.

A grating prism module 300, a cemented lens module 400, and a focusing inner cylinder 210 are provided within the coaxial transmission outer cylinder 200, and the terminal end (transmission light exit) of the coaxial transmission outer cylinder connects to an imaging mechanism (referring to FIGS. 1 and 7) with an embedded detector chip 50 and detector imaging surface 60. The cemented lens module 400 is fixedly provided inside the focusing inner cylinder 210, and the focusing inner cylinder 210 is placed within the adjustment chamber 220 of the coaxial transmission outer cylinder 200. The width of the adjustment chamber 220 is greater than the width of the focusing inner cylinder 210, allowing for the adjustment of the distance between the cemented lens module 400 and the grating prism module 300, as well as the detector chip 50 in different usage scenarios, so as to achieve dynamic focusing functionality.

Figure 4:
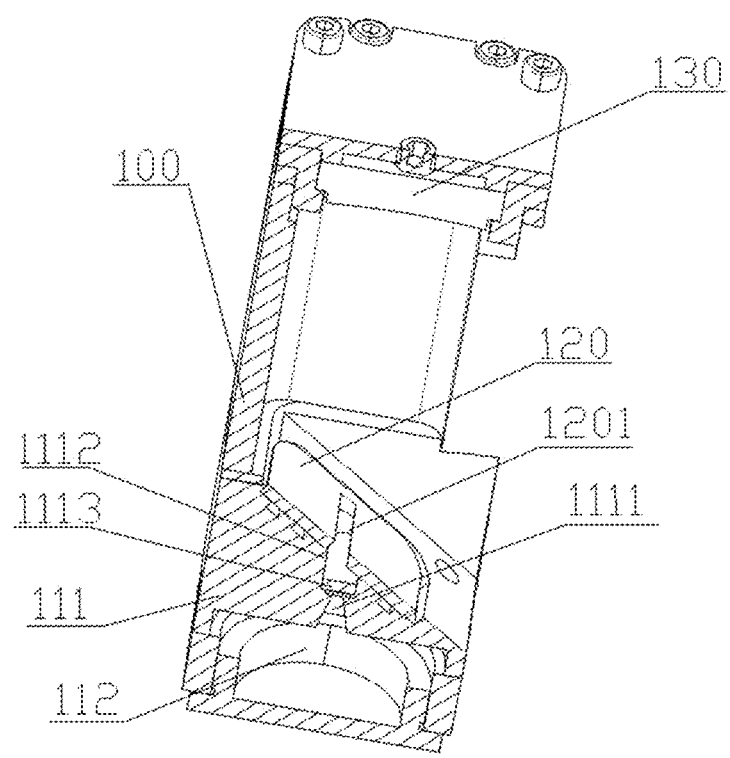
FIG. 4 is a structural schematic diagram of the inner cavity of the coaxial reflection outer cylinder and the slit component.

FIG. 4 is a structural schematic diagram of the inner cavity of the coaxial reflection outer cylinder and the slit component. The slit component 110 is located at the light entrance of the coaxial reflection outer cylinder 100, and the slit component 110 consists of a slit seat 111 and a front interface 112. The slit seat 111 is an inclined stand with the inclined side facing the coaxial transmission outer cylinder 200. A conical channel 1111 and a rectangular channel 1112 are formed on the slit seat. The conical channel 1111 is located at the bottom of the slit seat 111, and the rectangular channel 1112 is located at the top. A slit is formed at the connection between the conical channel and the rectangular channel, and a slit glass 1113 is placed inside the rectangular channel 1112.

Figure 5:
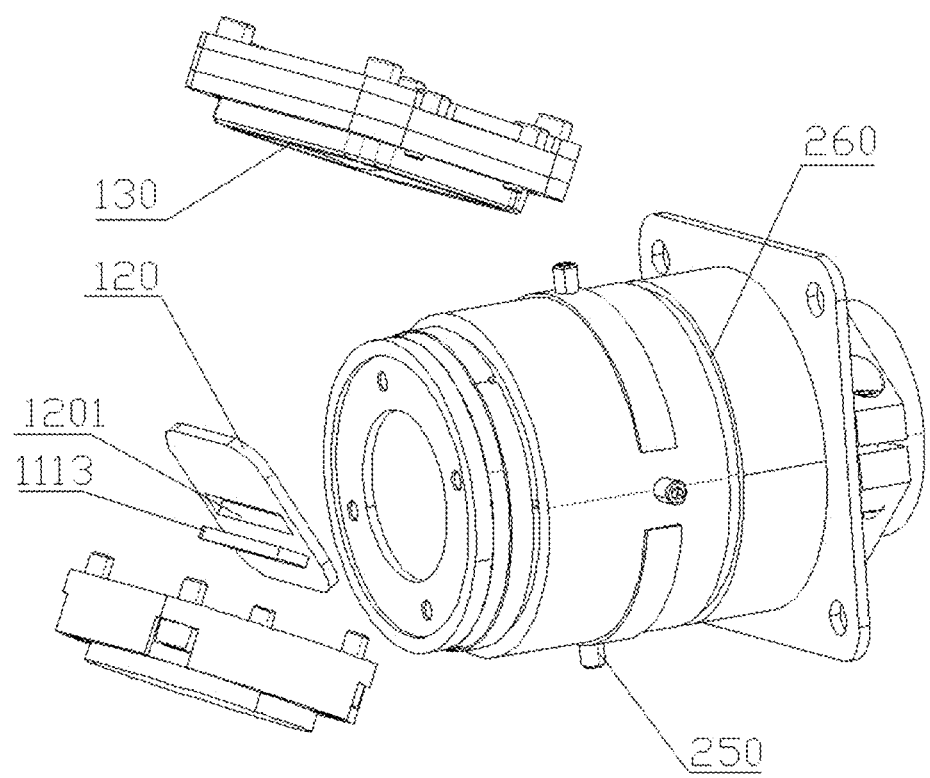
FIG. 5 is a schematic diagram of the coaxial transmission outer cylinder receiving the reflected optical path.
Figure 6:
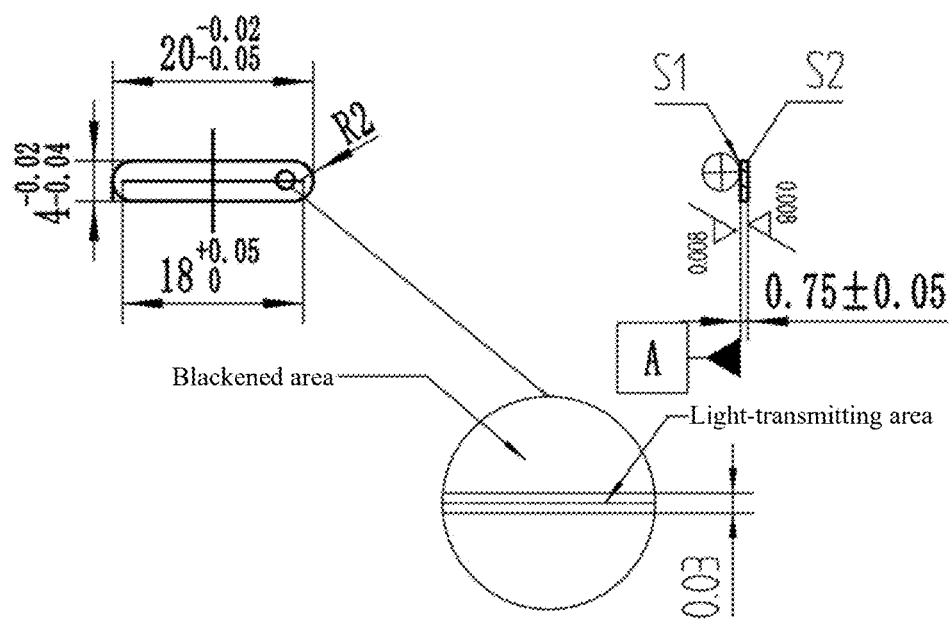
FIG. 6 is a detailed view of the slit and the slit glass.

To enhance the integration and reduce the volume of the spectrometer, in this embodiment, a groove is formed on the inclined surface of the slit seat 111, and a plane mirror 120 is embedded into the groove. As shown in FIGS. 5 and 6, a mirror gap 1201 is formed on the plane mirror 120, and the mirror gap 1201 is communicated with the rectangular channel 1112 below, allowing external light to enter the inner cavity.

In some possible embodiments, the slit glass 1113 is designed to have a width of 30 um and a length of 16 mm. After laser etching, light can only enter from the outer side. The back side of the slit glass 1113 is coated with a cadmium element thin film in the light-transmitting area to prevent reflected light from escaping.

In some embodiments, the structural parts on both sides of the conical channel 1111 are designed to be at a 15-degree angle with respect to the central axis of the incident slit (the total taper angle is 30 degrees) to ensure that the incoming light is not obstructed, maximizing the throughput efficiency.

The incident light passes through the incident slit, then the plane mirror 120, and enters the inner cavity, where the light information is mapped onto the spherical mirror 130. The outer side of the mirror is coated with a reflective film, and the thin film thereof has a wavelength range of 380 nm to 1000 nm, with an average reflectance R>0.97 in this wavelength range, while the back side of the mirror is coated with black matte paint. The design of the spherical mirror can adjust the incoming light to non-focusing parallel light. As the plane beam reflects back, significant light information loss can occur due to the mirror gap 1201 of the plane mirror 120, therefore this operation can reduce light loss.

In some embodiments, the surface of the plane mirror 120 is coated with a reflective film with a wavelength range set to 380 nm to 1000 nm, and the angle between this hollow plane mirror and the reflection optical axis (where incident light also enters along the reflection optical axis) is 55 degrees. The wavelength range of 380 nm to 1000 nm features an average reflectance of R>0.97. The back surface of the plane mirror 120 is coated with black matte paint to ensure that light only enters through the slit and the gap corresponding to the plane mirror.

After the incident light signal is reflected by the spherical mirror and returns to the outer surface of the plane mirror, and since the window formed in the middle of the mirror during design is very small, there is minimal loss of the light reflected back, and almost all of the light can be reflected again to enter the optical path of the transmissive lens group. According to proportional calculation, the total incident light is 100, and after internal optical path transmission through the spherical mirror and the hollow mirror group, the light loss in the etched slit area of the hollow mirror is less than 1%, which has been tested and verified not to affect the imaging.

Figure 7:
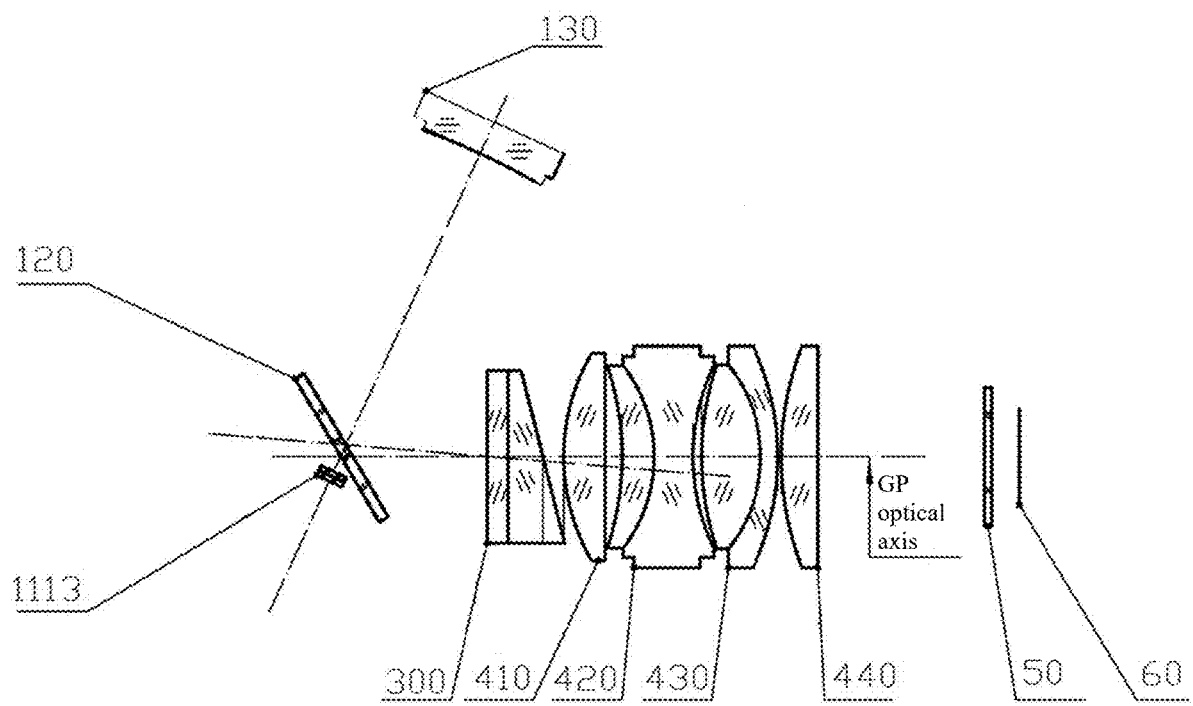
FIG. 7 is a schematic diagram of the optical path of the broad-spectrum imaging spectrometer based on reflection and transmission integrated structure.

FIGS. 5 and 7 are schematic diagrams of the coaxial transmission outer cylinder receiving the reflected optical path. A spherical mirror 130 is provided at the reflection end of the coaxial reflection outer cylinder 100. The spherical mirror 130 is mainly used to reflect the light entering from the slit, and the spherical mirror 130, the mirror gap 1201, the conical channel 1111, and the rectangular channel 1112 are perpendicular to the reflection optical axis of the coaxial reflection outer cylinder 100. The plane mirror 120 further reflects the light reflected by the spherical mirror 130 and directs the light into the coaxial transmission outer cylinder 200 for transmission.

Referring to FIGS. 3 and 5, an annular groove 230 is formed at the incident end of the coaxial transmission outer cylinder 200, and a removable annular connector 240 is provided at the terminal end. The grating prism module 300 is fixedly installed within the annular groove 230, and the inner diameter of the annular connector 240 is smaller than the outer diameter of the focusing inner cylinder 210, forming an adjustment chamber 220 between the annular groove 230 and the annular connector 240. The annular connector 240 is configured to connect the imaging mechanism (including the detector chip 50 and the detector imaging surface 60).

The grating prism module 300, the cemented lens module 400, the detector chip 50, and the detector imaging surface 60 are perpendicular to the transmission optical axis (GP optical axis) of the coaxial transmission outer cylinder 200, ensuring the accuracy of the transmission optical path and imaging.

Figure 8:
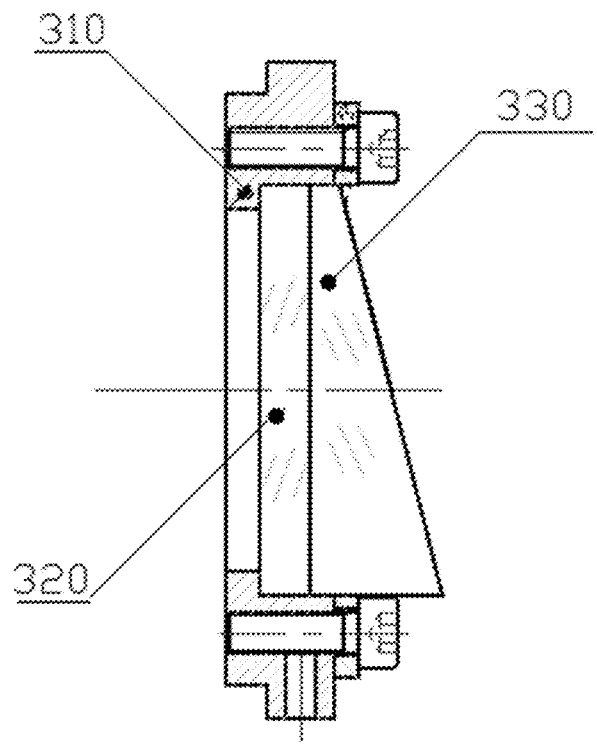
FIG. 8 is a structural schematic diagram of the grating prism module.
Figure 9:
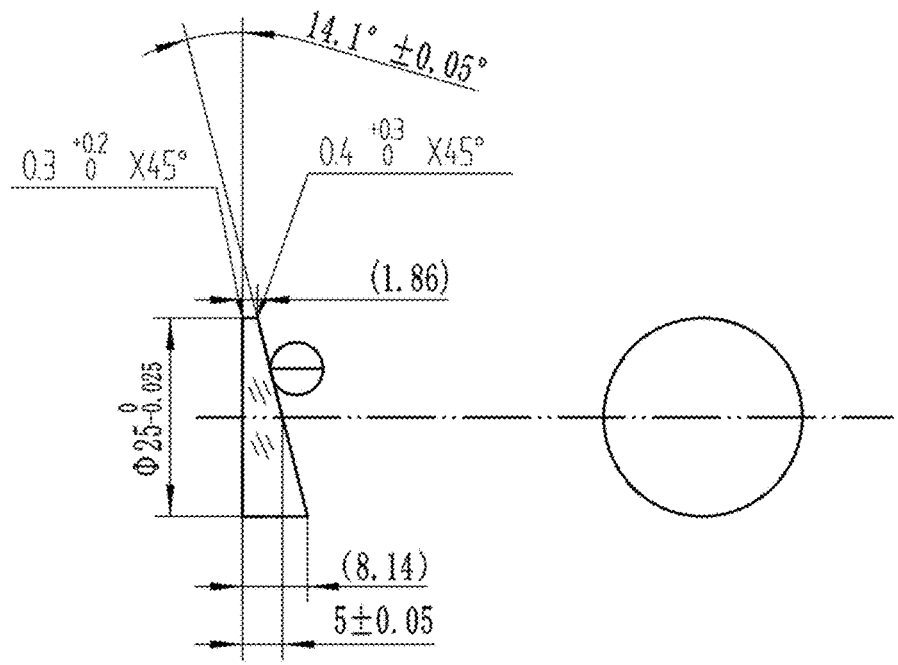
FIG. 9 is a schematic diagram of the structure and parameters of the wedge prism.
Figure 10:
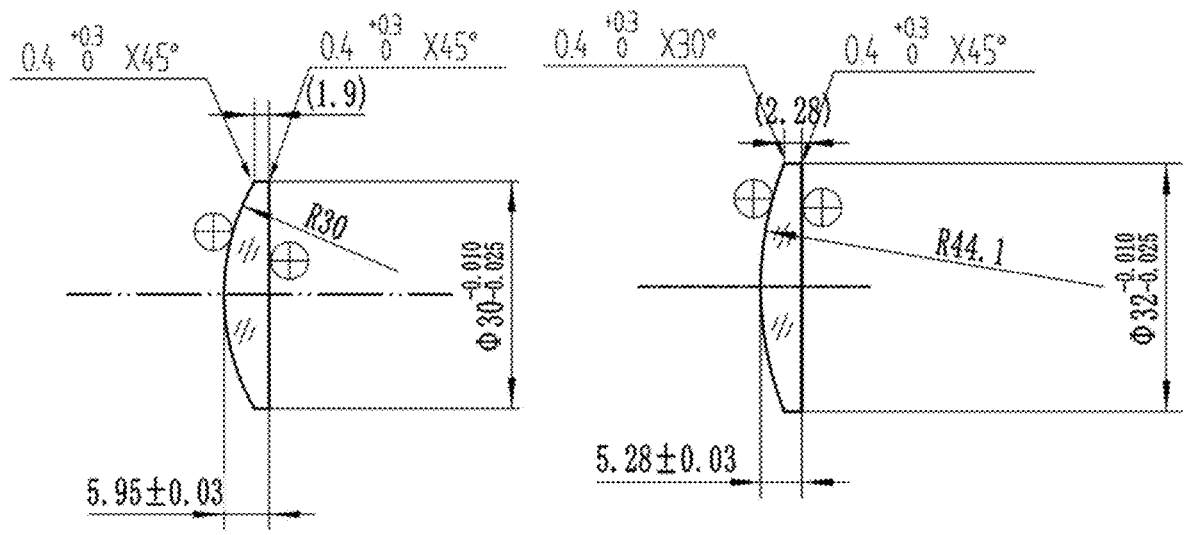
FIG. 10 is a schematic diagram of the structure and parameters of the first single lens and the second single lens.

As shown in FIGS. 8 and 9, the grating prism module 300 comprises an annular lens holder 310, a grating 320, and a wedge prism 330. The grating 320 and the wedge prism 330 are fixed inside the lens holder 310 according to the transmission direction. In one possible embodiment, the wedge prism has a thickness of 1.86 mm and 8.14 mm respectively at the top and bottom, with a center thickness of 5 mm and a diameter of 25 mm. The wedge prism is coated with a long-wave pass film layer on the surface, with a wavelength range of 380 nm to 1000 nm and a center wavelength set at $\lambda=632.8$ nm. The center transmittance t0 is greater than 0.99, with an average transmittance t greater than 0.98 in this wavelength range, and the transmittance t at both ends of the spectrum is greater than 0.97. The transmittance is cut off in the range of 300 nm to 380 nm. Additionally, the non-transmitting surface is coated with a black matte paint.

As shown in FIGS. 7 and 10 to 12, the cemented lens module 400 comprises the first single lens 410, the first cemented lens group 420, the second cemented lens group 430, and the second single lens 440 in sequence according to the transmission direction. Among them, the first single lens 410 and the second single lens 440 are single-sided convex lenses, each installed at the two ends of the focusing inner cylinder 210 through the lens holder 310. The convex surfaces of the two lenses face the incident end. The first single lens 410 (on the left side of FIG. 10) has a convex surface radius of 30 mm, a center thickness of 5.95 mm, and an edge thickness of 1.9 mm. The second single lens 440 (on the right side of FIG. 10) has a convex surface radius of 44.1 mm, a center thickness of 5.28 mm, and an edge thickness of 2.28 mm. Both of the two single lenses have a wavelength range of 380 nm to 1000 nm, a center wavelength of $\lambda=632.8$ nm, a center transmittance t greater than 0.99, an average transmittance t greater than 0.98 in this wavelength range, and a transmittance t greater than 0.97 at both ends of the spectrum. Additionally, the non-transmitting surfaces are coated with black matte paint.

Figure 11:
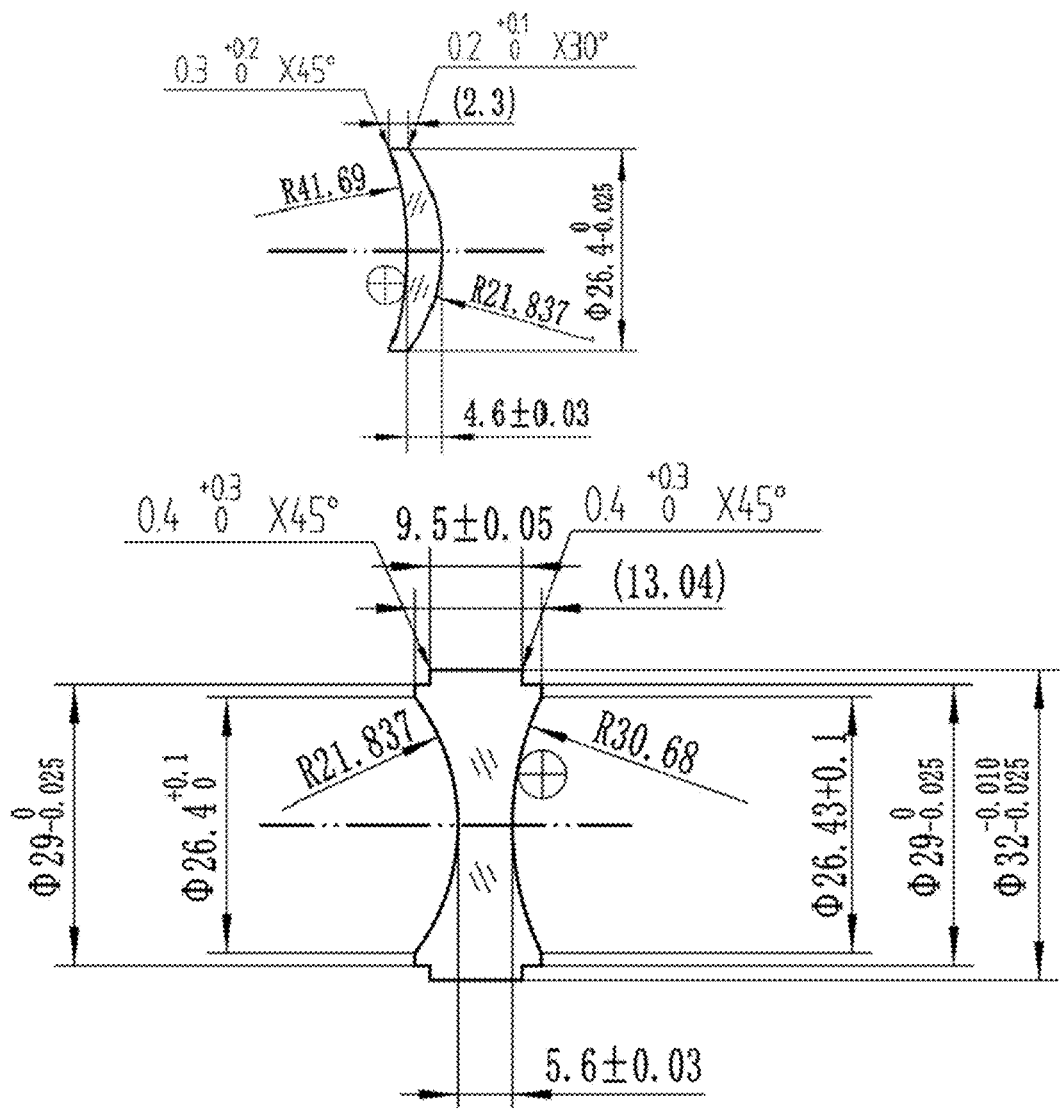
FIG. 11 is a schematic diagram of the structure and parameters of the first cemented module.
Figure 12:
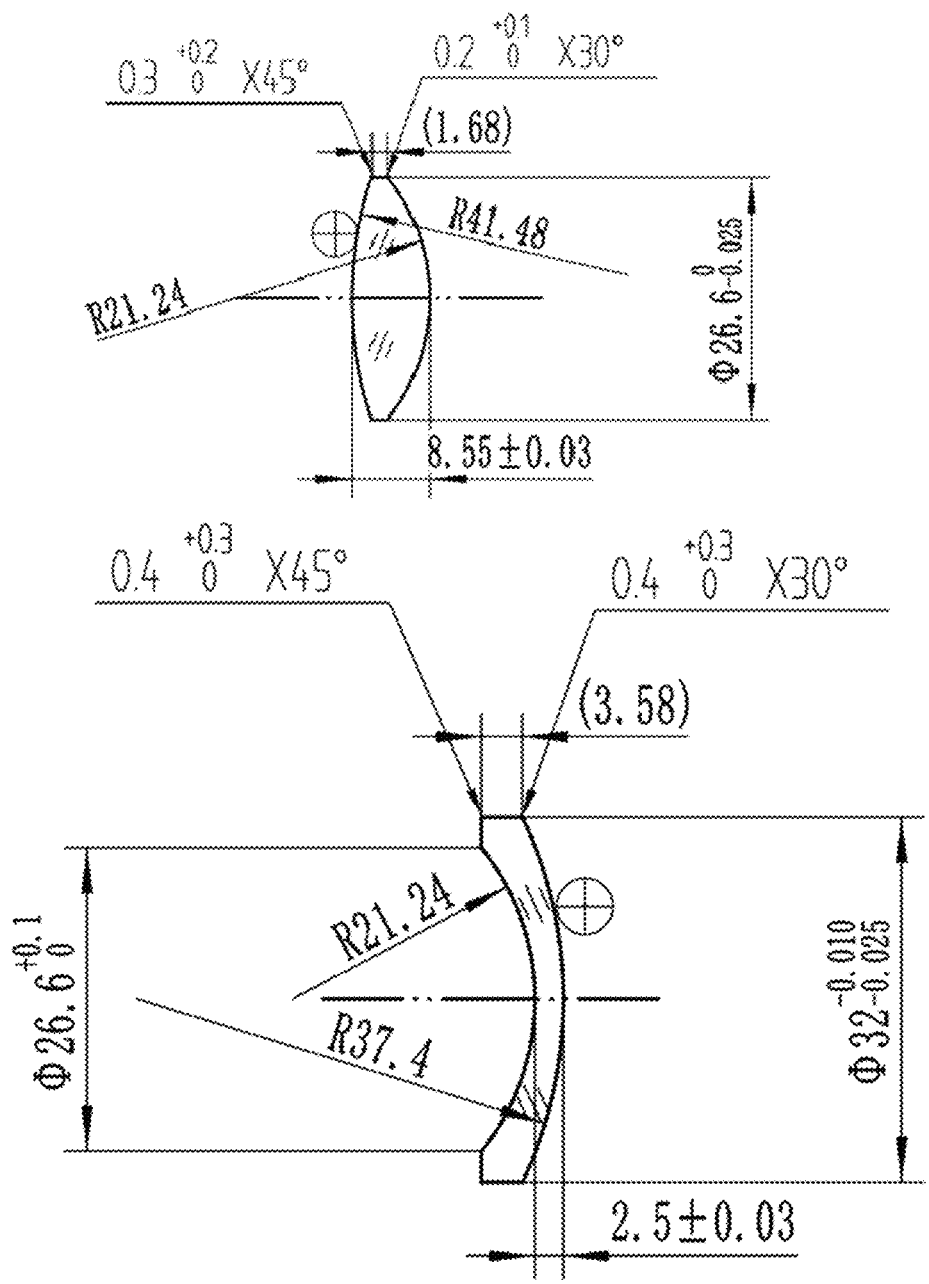
FIG. 12 is a schematic diagram of the structure and parameters of the second cemented module.

Specifically, as shown in FIGS. 11 and 12, the first cemented lens group 420 includes the first cemented convex lens 421 (on the upper side of FIG. 11) and the first cemented concave lens 422 (on the lower side of FIG. 11). The second cemented lens group 430 includes the second cemented convex lens 431 (on the upper side of FIG. 12) and the second cemented concave lens 432 (on the lower side of FIG. 12). The cemented lens modules are cemented using UV-curing optical adhesive, and the cemented surface shall not have oil stains, dust, air bubbles, and the like. During the bonding process, care is taken to ensure that the eccentricity between the optical axes of the second lens and the first lens is less than 0.01 mm. Additionally, the non-transmitting surfaces are coated with black matte paint.

Specifically, the first cemented convex lens 421 has a crescent-shaped cross-section with convex surface radii of 41.69 mm and 21.837 mm respectively on both sides. The upper thickness is 2.3 mm, and the lower thickness is 4.6 mm. The convex lens is coated with multiple layers of anti-reflective films. The first cemented concave lens 422 is a double-sided concave lens with concave surface radii of 21.837 mm and 30.68 mm respectively on both sides and a center thickness of 5.6 mm. The wavelength range is 380 nm to 1000 nm, with a center wavelength of 632.8 nm and a center transmittance greater than 0.99. The first cemented convex lens and the first cemented concave lens have a wavelength range of 380 nm to 1000 nm, a center wavelength of $\lambda=632.8$ nm, a center transmittance t greater than 0.99, an average transmittance t greater than 0.98 in this wavelength range, and a transmittance t greater than 0.97 at both ends of the spectrum. Additionally, the non-transmitting surfaces are coated with black matte paint.

The second cemented convex lens 431 is a double-sided convex lens with convex surface radii of 21.24 mm and 41.48 mm respectively on both sides and a center thickness of 8.55 mm. The top and bottom end thicknesses are 1.68 mm. The second cemented concave lens 432 has a crescent-shaped cross-section with concave surface radii of 21.24 mm and 37.4 mm respectively on both sides and a center thickness of 2.5 mm. The top and bottom end thicknesses are 3.58 mm. The wavelength range is 380 nm to 1000 nm, with a center wavelength of 632.8 nm and a center transmittance greater than 0.99. The second cemented convex lens and the second cemented concave lens have a wavelength range of 380 nm to 1000 nm, a center wavelength of $\lambda=632.8$ nm, a center transmittance t greater than 0.99, an average transmittance t greater than 0.98 in this wavelength range, and a transmittance t greater than 0.97 at both ends of the spectrum. Additionally, the non-transmitting surfaces are coated with black matte paint.

Referring to FIGS. 3 and 5, a clamp 250 and an annular focusing slot 260 are further provided on the outer wall of the focusing inner cylinder 210 of the spectrometer. Adjustment holes corresponding to the clamp 250 and the annular focusing slot 260 are formed on the coaxial transmission outer cylinder 200. The clamp 250 is fixed in place by adjusting the jackscrew through the adjustment holes to secure the focusing inner cylinder 210. By loosening the jackscrew, the focusing can be achieved by using external tools to mechanically move the focusing part. The relative spatial positions between the imaging lens group, consisting of the first single lens and the second single lens as well as the first cemented lens module and the second cemented lens module, the prism grating, and the detector are intended to ensure that the images formed by these lenses are all at the focal position. Once the focal position is determined, the screw marking the jackscrew is tightened, and afterwards the entire structure no longer needs further adjustments, achieving modular design and portable debugging and testing between modules.

Figure 13:
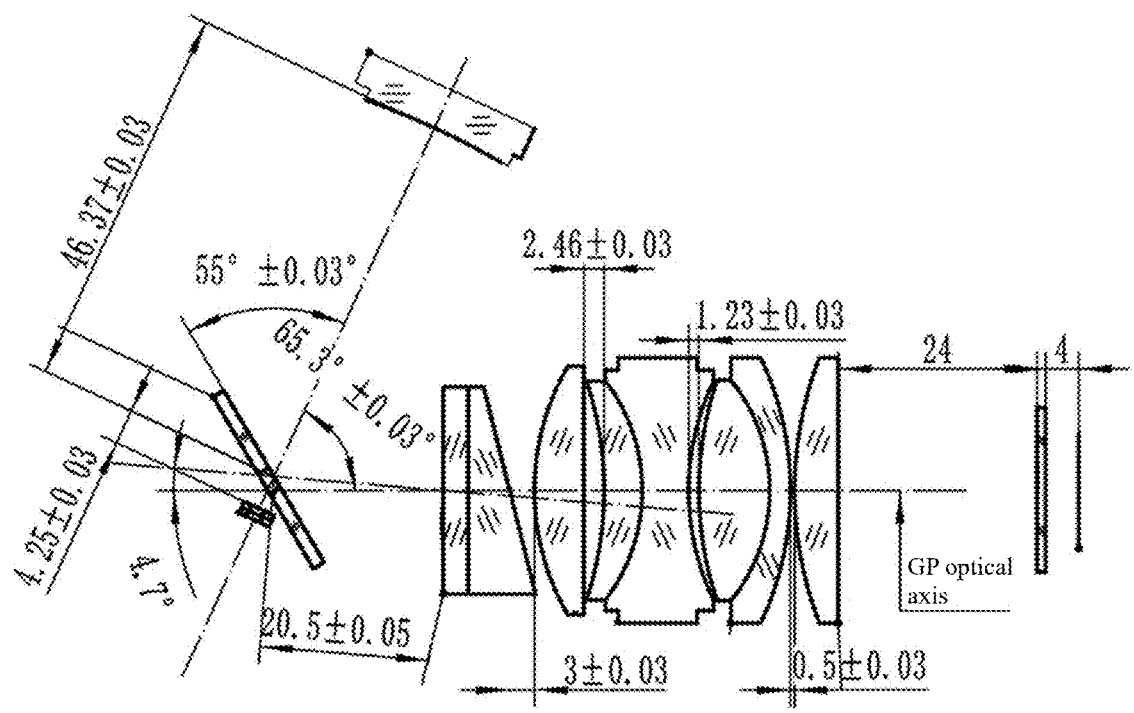
FIG. 13 is a schematic diagram of the parameters of the broad-spectrum imaging spectrometer based on reflection and transmission integrated structure.

Based on the parameters of each lens and the specified technical parameters of the wavelength range and center transmittance, in one possible embodiment, the spectrometer is designed based on the distance parameters in FIG. 13. The image from the object side enters the slit with a physical length of 16 mm and a width of 30 um, then passes through the plane mirror with the mirror gap, and reaches the surface of the spherical mirror, and the physical scale between the axis centers of the two plane mirrors is 46.37±0.03 mm.

The hollow plane mirror has a length of 18 mm in the direction parallel to the incident slit and a mirror width of 24 mm.

The spherical mirror has a width of 36 mm and a height (in the direction parallel to the slit) of 39 mm.

The grating prism has a width of 25 mm, and the size of the detector imaging surface is 13.3 mm (2048 um*6.5 um).

To ensure that the image of the incident object can be maximally presented on the detector target surface, the size and spatial distance of each optical lens are optimized during the design, such that without sacrificing imaging quality and spatial compactness, the following proportional relationship between the image formed by the detector and the object-side image at the incident slit is met:

The linear field of view on image side is 2y=13.3 mm, and 13.3 mm/16 mm=0.82, that is, the image height/object height=0.82. Therefore, the imaging relationship of this structure is not 1:1 imaging but presents a scaled-down image. Thus, by calculating NA=n*sin α, where the incident angle is 24°, the numerical aperture of the image side is 0.204 (dimensionless). The spectral dispersion width of the image plane is 1024*6.5 um=6.656 mm, and 6.656 mm/0.82=8.1 mm. The spectral range is set from 380 nm to 1000 nm.

Through the optimization design of imaging relationships, etc., high light throughput and spectral resolution requirements are ensured for the imaging spectrometer. The spectral resolution reaches 2.545 nm. For applications such as imaging of weak light targets, adjustments of spatial arrangement and imaging relationships can be made to achieve different numerical aperture design requirements, but this may lead to a loss of some optical performance requirements.

In summary, the solution adopts a reflection and transmission structure for an integrated imaging layout, which reduces three reflections to two reflections, achieving high light throughput while ensuring optimal imaging quality. The structure of the plane mirror with a slit on the mirror surface also ensures minimal light energy loss and has no impact on imaging quality. The spherical mirror confines imaging distance to a very small space, and the spatial arrangement between each lens establishes a scaled-down imaging relationship between the object-side image and the image-side image while enabling compact volume. Optimal efficiency and dispersion effects of the grating diffraction are ensured. The modular design of the transmissive lens group ensures flexible adjustments of the imaging relationships between the slit, the plane mirror group, the single lenses, the cemented lens group, and the detector, allowing for adjustable focal lengths. This enhances the versatility of the imaging spectrometer, expanding the spectral range to 380 nm to 1000 nm and improving the spectral resolution accordingly. The grating mechanism is designed in a wedge shape, eliminating the need for transmitting first and then reflecting and reducing the number of lens groups, thus further improving the imaging quality.

Compared to existing solutions, the present solutions overcome the low diffraction efficiency and bottleneck issues in achieving high-throughput spectral imaging applications in the current transmissive spectrometers, enabling the detection of weak signals. The imaging quality and performance of the present solutions are far superior to single transmissive or single reflective structures, leading to a reduced volume and cost. Moreover, the present solutions allow for more diverse application forms and scenarios, making it advantageous for industrial sorting, biomedicine, biofluorescence, microscopic imaging, drone-based imaging, and other industries. It provides robust support for the development of various industry applications.

The above description illustrates preferred embodiments of the present invention. It should be understood that the present invention is not limited to the specific embodiments mentioned above. Any devices and structures that are not explicitly described should be considered as implemented in ordinary ways within the field. Those skilled in the art can make various changes and modifications to the present invention or make amendments to create equivalent embodiments without departing from the technical solutions herein, and all of these variations do not affect the essence of the present invention. Therefore, any simple amendments, equivalent changes and modifications made to the above embodiments according to the technical essence of the present invention, which do not deviate from the technical solutions of the present invention, still fall within the protection scope of the technical solutions of the present invention.

What is claimed is:

1. A broad-spectrum imaging spectrometer based on reflection and transmission integrated structure, comprising a coaxial reflection outer cylinder configured to reflect an optical path and a coaxial transmission outer cylinder configured to transmit an optical path, wherein
    a slit component is provided at an incident end of the coaxial reflection outer cylinder to collect incident light; a spherical mirror and a plane mirror are provided above the slit component; the incident light passes through the plane mirror and undergoes a first reflection by the spherical mirror, and the plane mirror performs a second reflection of the light from the first reflection and directs the light into the coaxial transmission outer cylinder for transmission; and
    a grating prism module and a focusing inner cylinder are provided within the coaxial transmission outer cylinder along a transmission direction, a cemented lens module is provided in the focusing inner cylinder, and a terminal end of the outer cylinder connects to an imaging mechanism with an embedded detector chip and detector imaging surface; the cemented lens module is fixedly provided inside the focusing inner cylinder, the focusing inner cylinder is placed within an adjustment chamber of the coaxial transmission outer cylinder, and a width of the adjustment chamber is greater than a width of the focusing inner cylinder, facilitating changes in the distance between the cemented lens module and the grating prism module and the detector chip,
    wherein a clamp is provided and an annular focusing slot is formed on an outer wall of the focusing inner cylinder, and adjustment holes corresponding ot hte clamp and the annular focusing slot are formed on the coaxial transmission outer cylinder; the clamp and the annular focusing slot are configured to adjust a fastening state and a focal length of the focusing inner cylinder, respectively.

2. The broad-spectrum imaging spectrometer based on reflection and transmission integrated structure according to claim 1, wherein the slit component comprises a slit seat and a front interface, and a conical channel and a rectangular channel are formed on the slit seat; a slit is formed at a connection between the conical channel and the rectangular channel, and a slit glass is placed inside the rectangular channel; and
    the plane mirror is embedded on the slit component with a mirror surface facing a transmission optical axis of the coaxial transmission outer cylinder; a mirror gap communicating with the rectangular channel is formed on the plane mirror, allowing external light to enter an inner cavity.

3. The broad-spectrum imaging spectrometer based on reflection and transmission integrated structure according to claim 2, wherein the spherical mirror, the mirror gap, the conical channel, and the rectangular channel are located on a reflection optical axis of the coaxial reflection outer cylinder; the incident light passes through the mirror gap on the plane mirror along the reflection optical axis and is reflected by the spherical mirror back to the plane mirror; the plane mirror directs the second reflected light along the transmission optical axis into the coaxial transmission outer cylinder.

4. The broad-spectrum imaging spectrometer based on reflection and transmission integrated structure according to claim 3, wherein an annular groove is formed at an incident end of the coaxial transmission outer cylinder, and a removable annular connector is provided at a terminal end; the annular connector connects to the imaging mechanism; and
    the grating prism module is fixedly installed within the annular groove, and an inner diameter of the annular connector is smaller than an outer diameter of the focusing inner cylinder, forming the adjustment chamber between the annular groove and the annular connector.

5. The broad-spectrum imaging spectrometer based on reflection and transmission integrated structure according to claim 4, wherein the grating prism module and the cemented lens module are perpendicular to the transmission optical axis of the coaxial transmission outer cylinder.

6. The broad-spectrum imaging spectrometer based on reflection and transmission integrated structure according to claim 4, wherein the grating prism module comprises an annular lens holder, a grating, and a wedge prism; the grating and the wedge prism are fixed inside the lens holder according to a transmission direction.

7. The broad-spectrum imaging spectrometer based on reflection and transmission integrated structure according to claim 1, wherein the cemented lens module comprises a first single lens, a first cemented lens group, a second cemented lens group, and a second single lens in sequence according to a transmission direction; and the first single lens and the second single lens are single-sided convex lenses, each installed at two ends of the focusing inner cylinder through the fixed holder, with convex surfaces facing an incident end.

8. The broad-spectrum imaging spectrometer based on reflection and transmission integrated structure according to claim 7, wherein the first cemented lens group comprises a first cemented convex lens and a first cemented concave lens;

the first cemented convex lens has a crescent-shaped cross-section with convex surface radii of 41.69 mm and 21.837 mm respectively on both sides, a wavelength range of 380 nm to 1000 nm, a center wavelength of 632.8 nm, and a center transmittance greater than 0.99; and the first cemented concave lens is a double-sided concave lens with concave surface radii of 21.837 mm and 30.68 mm respectively on both sides, a wavelength range of 380 nm to 1000 nm, a center wavelength of 632.8 nm, and a center transmittance greater than 0.99.

9. The broad-spectrum imaging spectrometer based on reflection and transmission integrated structure according to claim 8, wherein the second cemented lens group comprises a second cemented convex lens and a second cemented concave lens;

the second cemented convex lens is a double-sided convex lens with convex surface radii of 21.24 mm and 41.48 mm respectively on both sides, a wavelength range of 380 nm to 1000 nm, a center wavelength of 632.8 nm, and a center transmittance greater than 0.99; and the second cemented concave lens has a crescent-shaped cross-section with concave surface radii of 21.24 mm and 37.4 mm respectively on both sides, a wavelength range of 380 nm to 1000 nm, a center wavelength of 632.8 nm, and a center transmittance greater than 0.99.

\* \* \* \* \*